US 8,661,426 B2

(12) United States Patent
Chapman et al.

(10) Patent No.: US 8,661,426 B2
(45) Date of Patent: Feb. 25, 2014

(54) METHOD FRAME AGGREGATION FOR LATEST USER-DEFINED CLASS LOADER IDENTIFICATION

(75) Inventors: Graham A. Chapman, Ottawa (CA); Aruna A. Kalagnanam, Bangalore (IN); Avinash Koradhanyamath, Bangalore (IN); Ajith Ramanath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 12/983,041

(22) Filed: Dec. 31, 2010

(65) Prior Publication Data

US 2012/0174084 A1 Jul. 5, 2012

(51) Int. Cl.
*G06F 9/44* (2006.01)

(52) U.S. Cl.
USPC ........... 717/166; 717/162; 717/164; 717/165; 717/167

(58) Field of Classification Search
None
See application file for complete search history.

(56) References Cited

U.S. PATENT DOCUMENTS

| 6,363,521 | B1 * | 3/2002 | Yasue et al. ................... 717/128 |
| 6,915,511 | B2 * | 7/2005 | Susarla et al. ................. 717/164 |
| 7,069,550 | B2 * | 6/2006 | Fraenkel et al. .............. 717/166 |
| 7,114,152 | B2 * | 9/2006 | Hogstrom et al. ............ 717/166 |
| 7,234,137 | B2 * | 6/2007 | Taylor et al. .................. 717/167 |
| 7,533,389 | B2 | 5/2009 | Verbeke et al. |
| 7,870,546 | B2 * | 1/2011 | Meduri et al. ................. 717/166 |
| 8,239,849 | B2 * | 8/2012 | Burns et al. ................... 717/166 |
| 2002/0133643 | A1 | 9/2002 | Bracha et al. |
| 2003/0121031 | A1 * | 6/2003 | Fraenkel et al. .............. 717/166 |
| 2003/0200350 | A1 | 10/2003 | Kumar et al. |
| 2004/0015920 | A1 * | 1/2004 | Schmidt ........................ 717/162 |
| 2004/0015936 | A1 * | 1/2004 | Susarla et al. ................. 717/165 |
| 2005/0060698 | A1 * | 3/2005 | Boykin et al. ................. 717/166 |
| 2006/0271922 | A1 * | 11/2006 | Chan et al. .................... 717/166 |
| 2007/0198475 | A1 * | 8/2007 | Meduri et al. .................... 707/3 |
| 2008/0127157 | A1 * | 5/2008 | Burns et al. ................... 717/166 |
| 2009/0144751 | A1 | 6/2009 | Fan et al. |

OTHER PUBLICATIONS

Sheng Liang et al., Dynamic Class Loading in the Java Virtual Machine, 1998 ACM, pp. 36-44, <http://dl.acm.org/citation.cfm?id=286945>.*
Li Gong, secure Java class loading, 1998 IEEE, pp. 56-61, <http://ieeexplore.ieee.org/stamp/stamp.jsp?tp=&arnumber=735987>.*
Vijay Saraswat, Java is not type safe, 1997 Citeseer, 20 pages, <http://citeseerx.ist.psu.edu/viewdoc/download?doi=10.1.1.36.9583&rep=rep1&type=pdf>.*
Hua-Ning Wang et al., Class Loader Firmware on Java SoC, 2008 IEEE, pp. 224-227, <http://ieeexplore.ieee.org/stamp/stamp.jsp?tp=&arnumber=4731412>.*

(Continued)

*Primary Examiner* — Thuy Dao
*Assistant Examiner* — Cuong V Luu
(74) *Attorney, Agent, or Firm* — Lee Law, PLLC; Christopher B. Lee

(57) ABSTRACT

Class loader changes from at least one user-defined class loader to a bootstrap class loader are determined by a stack processing module during de-serialization of a serialized data object. A reference to each user-defined class loader is stored separately from a thread method frame stack in response to each determined change from the at least one user-defined class loader to the bootstrap class loader. For each user-defined class load operation of a user-defined class associated with the de-serialization of the serialized data object, a latest user-defined class loader (LUDCL) is identified using the stored reference and the user-defined class is loaded using the identified LUDCL.

21 Claims, 5 Drawing Sheets

(56) References Cited

OTHER PUBLICATIONS

Laurentiu Lucian Petrea et al., Remote Class Loading for Mobile Devices, 2007 IEEE, <http://ieeexplore.ieee.org/stamp/stamp.jsp?tp=&arnumber=4271937>.*

Bernard Wong et al., Dynamically Loaded Classes as Shared Libraries an Approach to Improving Virtual Machine Scalability, 2003 IEEE, 10 pages, <http://ieeexplore.ieee.org/stamp/stamp.jsp?tp=&arnumber=1213123>.*

Daynes, et al., Sharing the Runtime Representation of Classes across Class Loaders, Book Chapter: ECOOP 2005—Object-Oriented Programming, Lecture Notes in Computer Science, Jul. 2005, pp. 97-120, vol. 3586/2005, Springer-Verlag Berlin Heidelberg, Germany.

Liang, et al., Dynamic Class Loading in the Java(TM) Virtual Machine, Proceedings of the 13th ACM SIGPLAN Conference on Object Oriented Programming Systems, Languages, and Applications, Oct. 1998, pp. 36-44, Association for Computing Machinery, Vancouver, B.C.

* cited by examiner

METHOD FRAME AGGREGATION FOR LATEST USER-DEFINED CLASS LOADER IDENTIFICATION

BACKGROUND

The present invention relates to identification of a latest user-defined class loader. More particularly, the present invention relates to method frame aggregation for latest user-defined class loader identification.

Serialization, or marshaling, is a process of decomposing an instantiated object into a data format that may be transmitted or transferred via a message. De-serialization, or un-marshaling, is a process of reconstructing an instantiated object at a receiving device in response to receipt of a message including an object formatted as serialized/marshaled data.

BRIEF SUMMARY

A method includes determining, via a stack processing module during de-serialization of a serialized data object, class loader changes from at least one user-defined class loader to a bootstrap class loader; storing, in response to each determined change from the at least one user-defined class loader to the bootstrap class loader, a reference to each user-defined class loader separately from a thread method frame stack; and for each user-defined class load operation of a user-defined class associated with the de-serialization of the serialized data object: identifying a latest user-defined class loader (LUDCL) using the stored reference; and loading the user-defined class using the identified LUDCL.

A system includes a memory and a processor programmed to determine, during de-serialization of a serialized data object, class loader changes from at least one user-defined class loader to a bootstrap class loader; store, in response to each determined change from the at least one user-defined class loader to the bootstrap class loader, a reference to each user-defined class loader separately from a thread method frame stack within the memory; and for each user-defined class load operation of a user-defined class associated with the de-serialization of the serialized data object: identify a latest user-defined class loader (LUDCL) using the stored reference; and load the user-defined class using the identified LUDCL.

A computer program product comprising a computer readable storage medium including computer readable program code, where the computer readable program code when executed on a computer causes the computer to determine, during de-serialization of a serialized data object, class loader changes from at least one user-defined class loader to a bootstrap class loader; store, in response to each determined change from the at least one user-defined class loader to the bootstrap class loader, a reference to each user-defined class loader separately from a thread method frame stack; and for each user-defined class load operation of a user-defined class associated with the de-serialization of the serialized data object: identify a latest user-defined class loader (LUDCL) using the stored reference; and load the user-defined class using the identified LUDCL.

DETAILED DESCRIPTION

Figure 1:
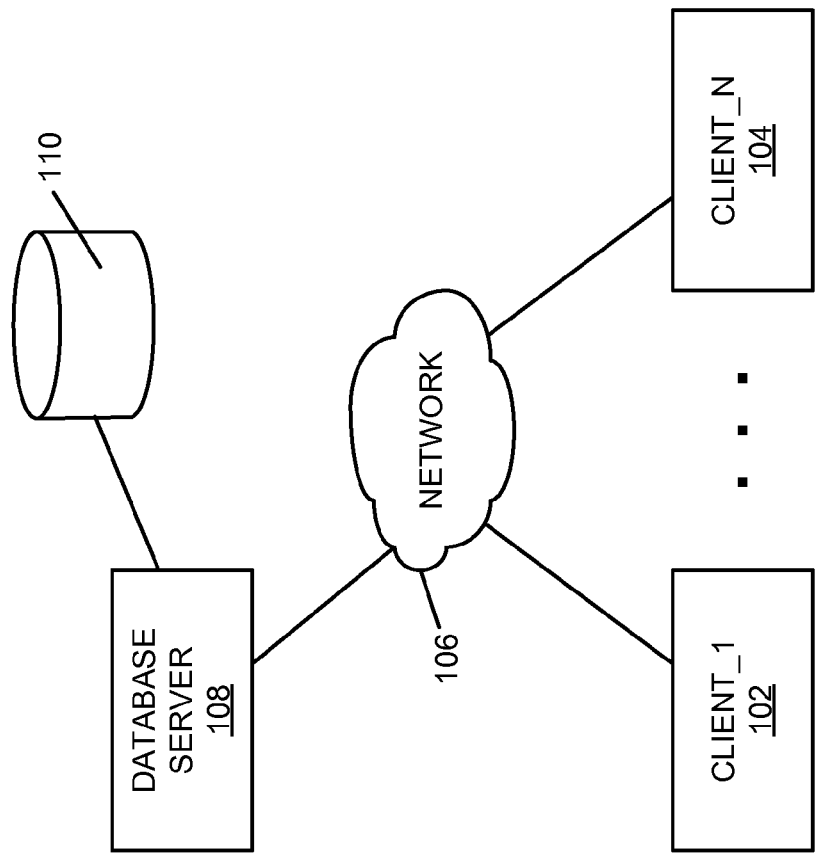
FIG. 1 is a block diagram of an example of an implementation of a system for method frame aggregation for latest user-defined class loader (LUDCL) identification according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides method frame aggregation for latest user-defined class loader (LUDCL) identification. The present subject matter operates by aggregating method frames of methods for classes loaded by a bootstrap loader within a thread's stack to expedite identification of a LUDCL, thereby reducing processing cycles and improving performance of stack walk procedures during identification of a LUDCL. The present subject matter further improves performance where stack frames of methods belonging to classes loaded by user-defined class loaders within a given stack thread are interleaved with stack frames of methods belonging to classes loaded by bootstrap/null class loaders. While the examples that follow illustrate use of the present subject matter during de-serialization/un-marshaling, the present subject matter may be utilized in other situations as appropriate for a given implementation. Accordingly, all such implementations are considered within the scope of the present subject matter.

An example situation where the present subject matter may be utilized is during de-serialization (un-marshaling) of objects received as serialized (marshaled) data in association with a message. Such a situation may occur when storing instantiated data objects to an object database or transfer of an object from one system to another. Using Java® programming language as an example, the bootstrap/null class loader is a parent of all other class loaders including the Java® development kit's (JDK's) application class loader. The bootstrap class loader loads system classes that are a part of JDK class libraries. The bootstrap class loader is also referred to herein as a "null" class loader. For purposes of the examples described herein, reference to a "user-defined method" means stack frames of methods belonging to a class loaded by a user-defined class loader. However, it should be understood that in certain implementations, user-defined classes may be loaded by a bootstrap loader. Additionally, it should be noted that certain implementations (e.g., other than current Java®) may provide support for more than one native class loader similar to the one bootstrap loader currently utilized within Java®. Further, hierarchies of bootstrap loaders may be supported. As such, the term "bootstrap" loader as used herein also includes a multiple and/or hierarchical class loaders that are native to a given environment, as appropriate for a given implementation. Accordingly, the present subject matter also applies to programs and systems similar to the Java® Virtual Machine (JVM) that provide mechanism(s) for multiple, parallel executing, native class loader implementations and their hierarchies similar to the current bootstrap class loader implementation in the JVM. It should further be noted that, while the examples described herein are directed to de-serialization of a serialized data object, the present subject matter may also be utilize in other implementations. For example, where a diagnostic tool is utilized to print method frames from a thread method frame stack, the present subject matter may be utilized to limit a number of method frames that are printed. Many other implementations are possible and all are considered within the scope of the present subject matter.

Examples of JDK classes that are loaded by a bootstrap loader are classes in packages such as "java.lang," "java.io," "java.util," and other packages. The application class loader supplied with the JDK and all of its sub-classes (e.g., those that inherit attributes or functionality from the java.lang.ClassLoader class) are referred to herein as user-defined class loaders. These user-defined class loaders are also referred to herein as "non-null" class loaders. As such, if at least one method of a stack is a part of a class that is loaded by a user-defined class loader, then the LUDCL is considered "non-null."

The first non-null class loader that was used to load the class of a method in the current thread stack (from the top of the stack) is referred to as latest user-defined class loader (LUDCL). If all of the methods of the stack are a part of classes that are loaded by the bootstrap/null class loader, then the LUDCL is considered "null." In a multi-threaded environment, where each thread performs de-serialization on its own and independent from others, the respective LUDCL is looked up from the corresponding thread's own method frame stack.

During an un-marshaling/de-serialization process, a new instance of an object is created from a serialized data object, such as a serialized data object received within a message. As such, at least one corresponding class associated with the object has to be loaded if not already loaded. Certain of the examples described herein refer to the Common Object Request Broker Architecture (CORBA) architecture and specification, though it is understood that the present subject matter is not limited to CORBA-compliant systems. The CORBA specification mandates that the class loading, at first, should be attempted using the LUDCL. Use of an LUDCL may fail for various reasons, such as there is no LUDCL in the current thread stack because all methods in the stack are defined in classes loaded by the bootstrap/null loader. If identification/use of an LUDCL fails for any reason, the present subject matter attempts to load a given class using alternative mechanisms, such as use of another class loader (e.g., a class loader called Remote Method Invocation (RMI) class loader, etc.). By use of the method frame aggregation for latest user-defined class loader (LUDCL) identification described herein, the present subject matter operates to reduce computational requirements for identification of the LUDCL or selection of a new UDCL where an LUDCL does not exist within a given stack frame.

Obtaining the LUDCL for a particular thread is performed by invocation of certain virtual machine application programming interfaces (APIs) and this occurs during every de-serialization/un-marshaling of a CORBA message. Using an example of several enterprise applications, extensive central processing unit (CPU) time may be spent in the Java® virtual machine (JVM) and just-in-time (JIT) (collectively JVM/JIT) procedures that assist in thread stack walk to identify the LUDCL. For conventional systems, the CPU time may further be increased in cases where the payload is deeply nested and the nested container objects are loaded by the bootstrap class loader. However, the present subject matter provides operations to improve CPU usage for LUDCL identification.

The present subject matter obtains the LUDCL from a given thread stack by aggregating method frames corresponding to methods of classes loaded by the bootstrap class loader. Such an approach isolates optimization to de-serialization/un-marshaling code path and as a result does not compromise performance of other components or modules of Java®/JVM. The present subject matter also reduces CPU utilization by the stack walk procedures of JVM/JIT and complies with the Java®/JVM and CORBA specification.

The method frame aggregation for latest user-defined class loader (LUDCL) identification described herein may operate at a development kit level, such as within a Java® development kit (JDK), within a system or at an application level. API routines may be defined for use at either the development kit or application level for marking and unmarking aggregations of bootstrap/null method frames, for use in identifying the LUDCL, and for other management activities as described in more detail below. The method frame aggregation for latest user-defined class loader (LUDCL) identification operates by identifying a class loader associated with each class about to be invoked. A stack processing module may implement the present functionality, either at the JDK level or at the application level, or may be a stand alone or modular component for a hardware implementation. For a hardware implementation, API invocations may be implemented as register-based operations or otherwise as appropriate for a given implementation.

De-serialization, or un-marshaling, may result in a recursive invocation of methods and a recursive exiting of methods for reconstruction of an instantiated object. It should be noted that, in addition to changes between user-defined class loaders and the bootstrap loader, where a LUDCL is not capable of loading a particular class, the user-defined class loader may also change, thereby resulting in a new LUDCL. Such a transition between user-defined class loaders may occur with or without intervening bootstrap loader method invocations. There are scenarios in de-serialization when the program execution (e.g., control flow) goes out of the JDK/CORBA source code into the application code and returns to the JDK/CORBA source code. When the control goes to the application, the application is free to invoke a method (and hence create a stack frame on the current thread stack) whose class is loaded by a user-defined class loader. This changes the LUDCL. As such, the present subject matter performs checks to accommodate such circumstances, as described in more detail below, to determine class loader changes between a bootstrap class loader and at least one user-defined class loader. Further, sequences of methods loaded by the bootstrap class loader within a method frame stack may be aggregated based upon the determined class loader changes to form an aggregated method frame stack. While reconstructing a serialized object during de-serialization, the latest user-defined class loader (LUDCL) may be identified using the aggregated method frame stack and the identified LUDCL may be used to load the corresponding class/type of the object under construction.

As an example of identification of a class loader associated with a given method/class, the following pseudo code may be used to determine/identify whether a given method is associated with the bootstrap class loader or a user-defined class loader.

```
ClassLoader CL = Object.getClass( ).getClassLoader( );
If (CL == null) {
    System.out.println ("Bootstrap");
} else {
    System.out.println ("UserDefined");
}
```

As can be seen from the above pseudo code, the conditional statement determines whether a class loader is associated with the bootstrap class loader (e.g., is null) or a user-defined class loader (e.g., is non-null). It should be noted, that while the present pseudo code example performs a print line function, assignment of a value indicative of the respective class loader may be performed and utilized for additional processing, such as invocation of additional APIs as described below.

Further, while the examples that follow reference the JDK, it is understood that the present subject matter may be utilized in any implementation where an object that has been serialized into a data stream or message must be reconstructed on a destination platform (e.g., a database or other system). As such, the present subject matter may be applied to other environments/systems where de-serialization or reconstruction of objects is performed. Current examples of such systems include, but are not limited to, a .NET framework, a javascript object notation (json) framework/platform, or other platforms. Accordingly, the present subject matter and examples described herein may be modified as appropriate for a given implementation without departure from the scope of the present subject matter.

The loader may be either a bootstrap/null class loader associated with the development kit or a user-defined class loader. In response to determining that a method that is about to be invoked changes the class loader either from the bootstrap/null class loader to a user-defined class loader or between user-defined class loaders, the stack processing module may perform certain actions, as described in more detail below, to identify the class loader transition/change.

Certain application programming interfaces (APIs) may be utilized to assist with the processing described herein. For example, an API routine/method called "LUDCLMarkFrame( )" may be defined and used to mark the current stack frame as the point at which to terminate the latest user-defined class loader (LUDCL) search. The method marks the current frame and returns the previous mark information. The marked method frame provides an indication that an end of a bootstrap loader aggregation is associated with the current method frame and that the stack walk may end with the marked frame.

It should be noted that the LUDCL may or may not have changed in the subsequent method calls above the marked frame in the particular thread stack from the marked method frame. As such, during the stack walk, if a method frame is found whose class is loaded by a non-null (user-defined) loader before the marked method frame is encountered, then that non-null loader may be returned as the LUDCL. Otherwise, "null" may be returned indicating that the LUDCL has not changed since the last mark. In such a situation, for implementations that utilize a separate LUDCL stack, where the LUDCL has not changed, the class loader identified in the top of stack in the separate LUDCL stack may be used and identified as the LUDCL.

Alternatively, it should be noted that the stack walk occurs from a start of a new aggregation to an end of the previous aggregation. As such, if the first frame read is a marked frame, this may also indicate that the LUDCL has not changed. As such, the stack walk may be terminated and the user-defined loader present on the top of the LUDCL stack during de-serialization may be used and identified as the LUDCL. Accordingly, in response to a determination that the LUDCL stack does not include the LUDCL reference, the thread method frame stack may be walked until the first encountered user-defined class loader that loaded a class associated with a method in the thread method frame stack is found. If the LUDCL is not found until the base of the thread method frame stack is encountered, it is concluded that a user-defined class loader does not exist in the current thread method frame stack and, as such, the system proceeds to employ an alternate class loader object for the class loading operation.

Additionally, an API routine/method called "LUDCLUnmarkFrame (long previousValue)" may be defined and used to restore the previous marked frame state to the respective thread. This method uses the returned value from the LUDCLMarkFrame( ) method to restore the previous state of the mark values.

Further, an API routine/method called "GetLatestUserDefinedLoader( )" may be used to walk method frames within a given stack until the LUDCL, a method frame marked using the LUDCLMarkFrame( ) API, or the base of the stack is found. If a marked frame or the base of the stack is found, the method may return with a null return value.

It should further be noted that the GetLatestUserDefinedLoader( ) API operates to provide information for two portions of the processing described herein. The first associated information provided by use of the GetLatestUserDefinedLoader( ) API may be associated with a start of aggregation (e.g., a detected transition from a user-defined class loader to the bootstrap loader). This invocation of the GetLatestUserDefinedLoader( ) API may initiate a walk of the thread stack (e.g., search) until a method belonging to a class loaded by a user-defined class loader is identified (where the LUDCL may be identified in association with the method) or alternatively until the bottom of the stack is identified (where in the latter case there is no LUDCL). In response to identifying an LUDCL, a "Push" LUDCL operation to push a reference (e.g., value) to a current UDCL onto the separate LUDCL stack is performed. As such, in response to a first and subsequent identification of a UDCL, the LUDCL stack will include a reference to the respective user-defined class loader. For purposes of the present subject matter, the reference to the UDCL that is pushed onto the LUDCL stack may be any form of reference to the UDCL as appropriate for a given implementation. For example, the reference to the UDCL may include a pointer/address, a class name, or any other form of reference appropriate for a given implementation. The operation to "Push" the LUDCL is performed each time when the LUDCL has changed at a start of aggregation before re-entry into the method. Otherwise, the actual push operation to the LUDCL stack will not occur even where the API call to GetLatestUserDefinedLoader( ) is invoked.

The second associated information provided by use of the GetLatestUserDefinedLoader( ) API may be for retrieval of the LUDCL in response to a class load operation for a user-defined class during the de-serialization of a serialized data object from either from the LUDCL stack (where the LUDCL stack includes at least one UDCL) or by walking the thread method frame stack until a user defined method or the bottom of the stack is identified. The "Get" LUDCL functionality is used while attempting to load a given class during de-serialization/un-marshaling of a serialized object received within a message. This operation occurs while the class load sub-operation is underway during the de-serialization operation.

The operations performed to find the LUDCL in the former case and to check if the LUDCL has changed in the latter case are the same, by calling a GetLatestUserDefinedLoader( ) method. However, this method, GetLatestUserDefined-Loader( ), improves efficiency by checking/determining whether the current method on the thread stack is "marked" or not before walking further to the next frame. As described above, where a marked frame is encountered, the stack walk may be terminated. It should be noted that the thread stack may include only method frames defined in classes loaded by the null/bootstrap loader and that no UDCL has been invoked during certain processing intervals.

It should further be noted that, for implementation of the "Get" LUDCL functionality, the present subject matter may perform a "peek" operation, as described in more detail below, to retrieve a reference to the LUDCL from the LUDCL stack, and in certain situations, to retrieve the LUDCL without requiring a stack walk of the method frames on the thread stack. However, it should be noted that since the LUDCL is pushed to the LUDCL stack in response to determinations of class loader changes from user-defined class loaders to a bootstrap class loader, the LUDCL may have changed since a last push of the LUDCL onto the LUDCL stack. As such, the stack walk described above may be performed even where a value is found on the LUDCL stack. Such a stack walk may be terminated in response to identifying a marked frame, as described above and in more detail below. As also described in more detail below, using a "peek" operation rather than a "pop" operation on the LUDCL stack may prevent corruption of the LUDCL stack during de-serialization/un-marshaling operations. The actual references stored on the LUDCL stack may then be "popped" from the LUDCL stack as methods are exited, as described in more detail below.

In such a situation where the "peek" operation is used to identify the LUDCL, the GetLatestUserDefinedLoader( ) makes certain that there are no "null" entries pushed on to the LUDCL stack and that that LUDCL stack is not empty prior to performing an assignment of an LUDCL from the LUDCL stack for use during class loading for de-serialization/un-marshaling of an object. As such, a null value will not be used for the LUDCL and where the LUDCL stack does not include an LUDCL reference, a stack walk procedure may be used in conjunction with aggregated bootstrap/null loader invoked methods to further improve efficiency for identification of the LUDCL if a UDCL has been previously used to load at least one other user-defined class. As such, for the "Get" LUDCL functionality, there is no need to walk the thread stack unless the LUDCL stack is empty and the LUDCL may be identified using a "peek" operation on the LUDCL, and the returned LUDCL (if one is returned) may be used where at least one valid UDCL reference is located on the LUDCL stack by the "peek" operation.

The following pseudo code examples represent processing that may be performed to determine whether the LUDCL stack includes any entries. The first example pseudo code below represents a relevant portion of a load class procedure for assigning the LUDCL as the class loader to be used to attempt to load subsequent classes during de-serialization/un-marshaling of a serialized data object along with an attempt to load the class using a class loader returned from the LUDCL stack.

```
// Relevant portion of the load class procedure:
    ClassLoader LUDCL = LUDCLStack.peek( );
    if(null == LUDCL) {
    // peek( ) returned null, so walk thread frame stack and
    identify LUDCL
        LUDCL = getLatestUserDefinedLoader( );
    }
    // now attempt to load Object1 class with the LUDCL
    Class cls = loadClass ("path.Object1", LUDCL);
```

As can be seen from the example pseudo code above, the LUDCL stack is queried with the "peek( )" method to retrieve the reference of the LUDCL if at least one reference exists on the LUDCL stack. If there is no LUDCL reference on the LUDCL stack, the thread frame stack is walked to identify LUDCL. Finally, the identified LUDCL from either the LUDCL stack or the thread frame stack walk operation is used to attempt to load Object1 class. It is understood that where the identified LUDCL is not capable of loading the class, a default class loader capable of loading the method may then be retrieved. For purposes of the present example, the RMI class loader associated with the JDK may be used. However, it is understood that each platform may define a default class loader that may be used in such a situation as appropriate for a given implementation.

The following example pseudo code represents one possible way of creating an LUDCL stack.

```
// LUDCLStack data-structure/class has this member/field:
    Stack ludcl_stack = new Stack( );
```

As can be seen from the above example pseudo code, the "new" operator is used to create a stack. The created stack is assigned as the LUDCL stack.

The following example pseudo code represents one possible implementation of the "peek( )" method utilized above with the first example pseudo code of the present set of pseudo code examples.

```
// Relevant portion of the peek( ) method is below:
    if (ludcl_stack.isEmpty( )) {
        return null;
    } else {
        return ludcl_stack.peek( );
    }
```

As can be seen from the above example pseudo code, the LUDCL stack is examined to determine whether it is empty. If the LUDCL stack is empty, the "peek( )" method returns "null." If the LUDCL stack is not empty, the reference to the LUDCL is returned without requiring an actual "pop" operation on the LUDCL stack. As such, processing for removing UDCL references from the LUDCL stack may be performed as methods exit during the de-serialization/un-marshaling process, and the operations to "Get" the LUDCL do not corrupt the stack.

Using the above mentioned APIs, programs such as the JDK may aggregate methods that are known to belong to classes loaded by the null/bootstrap class loader. When a method that may potentially alter the LUDCL is about to be invoked, the program marks the current method frame using LUDCLMarkFrame( ) API. Later when the LUDCL has to be obtained from the stack, the GetLatestUserDefinedLoader( )

API may be invoked to identify the LUDCL. This API will terminate the stack walk when the marked frame is encountered and return a null.

As a further optimization, the program may invoke the GetLatestUserDefinedLoader( ) API in the first method where the next aggregation of methods begins instead of the place where the LUDCL is finally used (during class loading). Since the LUDCL search procedure is invoked at the start of an aggregation, the possibility of finding a user-defined loader immediately and without walking a lot of method frames increases.

If a non-null value is returned by the GetLatestUserDefinedLoader( ) API, the return value (the new LUDCL) may be stored in a separate "LUDCL Stack" data structure and this process may recursively be performed at every level of nesting in a deeply nested object. When the system returns after reading an object at a certain level of nesting in the deeply nested object, it pops from the LUDCL Stack data structure and invokes the LUDCLUnmarkFrame( ) API to remove a mark from a previously marked frame. In this way, the number of stack frames that are walked for every invocation of GetLatestUserDefinedLoader( ) may be reduced.

The method frame aggregation for latest user-defined class loader (LUDCL) identification described herein may be performed in real time to allow prompt identification of the LUDCL within a given stack. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Further, with reference to the description above, the terms serialize or serializing and marshal or marshaling, respectively, may be used interchangeably within the description of the examples that follow for readability. Further, the terms de-serialize or de-serializing and un-marshal or un-marshaling, respectively, may be used interchangeably within the description of the examples that follow for readability.

FIG. 1 is a block diagram of an example of an implementation of a system 100 for method frame aggregation for latest user-defined class loader (LUDCL) identification. A client_1 102 through a client_N 104 communicates via a network 106 with a database server 108. The database server 108 further interfaces with an object database 110 for storage and retrieval of data objects generated or requested, respectively, by the client_1 102 through the client_N 104.

As such, for purposes of the present example, the client_1 102 through the client_N 104 may instantiate objects and serialize the generated objects for storage via the database server 108 within the object database 110. The serialized objects may be sent within one or more messages to the database server 108 via any protocol appropriate for a given implementation. In response to receipt of one or more messages including a serialized data object, the database server 108 may de-serialize the object and instantiate the object for storage within the object database 110.

Additionally, the database server 108 may retrieve instantiated objects from the object database 110 in response to requests for objects received from one or more of the client_1 102 through the client_N 104. The database server 108 may serialize the retrieved objects for transmission to the respective one or more of the client_1 102 through the client_N 104. The serialized objects may be sent within one or more messages to the respective one or more of the client_1 102 through the client_N 104 via any protocol appropriate for a given implementation. In response to receipt of one or more messages including a serialized data object, the respective one or more of the client_1 102 through the client_N 104 may de-serialize the object and instantiate the object.

As such, the client_1 102 through the client_N 104 and the database server 108 may each serialize and de-serialize objects. Further, the messaging and functionality within the system 100 may comply with any appropriate standard for a given implementation, such as the CORBA specification. Additionally, while the present example utilizes certain devices for purposes of description, it should be understood that the present subject matter is not limited to implementation in association with the devices described. The present subject matter may be implemented within any system where de-serialization/un-marshaling of an object is appropriate. As such, the present examples are for ease of illustration purposes and impose no limitation on the applicability of the present subject matter.

As will be described in more detail below in association with FIG. 2 through FIG. 5, each of the client_1 102 through the client_N 104 and the database server 108 provides automated method frame aggregation for latest user-defined class loader (LUDCL) identification. The automated method frame aggregation for LUDCL identification is based upon aggregation of method frames associated with a bootstrap loader to improve efficiency for stack walk processing for de-serialization of data objects. The automated method frame aggregation for LUDCL identification may further be based upon storage of LUDCL references within a separate LUDCL stack to further improve performance of de-serialization within certain implementations.

It should be noted that any of the client_1 102 through the client_N 104 and the database server 108 may be a portable computing device, either by a user's ability to move the respective device to different locations, or by the respective device's association with a portable platform, such as a plane, train, automobile, or other moving vehicle. It should also be noted that the devices described herein may be any computing device capable of processing information as described above and in more detail below. For example, the client_1 102 through the client_N 104 and the database server 108 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The database server 108 may include any device capable of providing data for consumption by a device, such as the client_1 102 through the client_N 104, via a network, such as the network 106. As such, the database server 108 may include a web server or other data server device. Additionally, the client_1 102 through the client_N 104 may include any device capable of generating data objects for storage within the object database 110.

Figure 2:
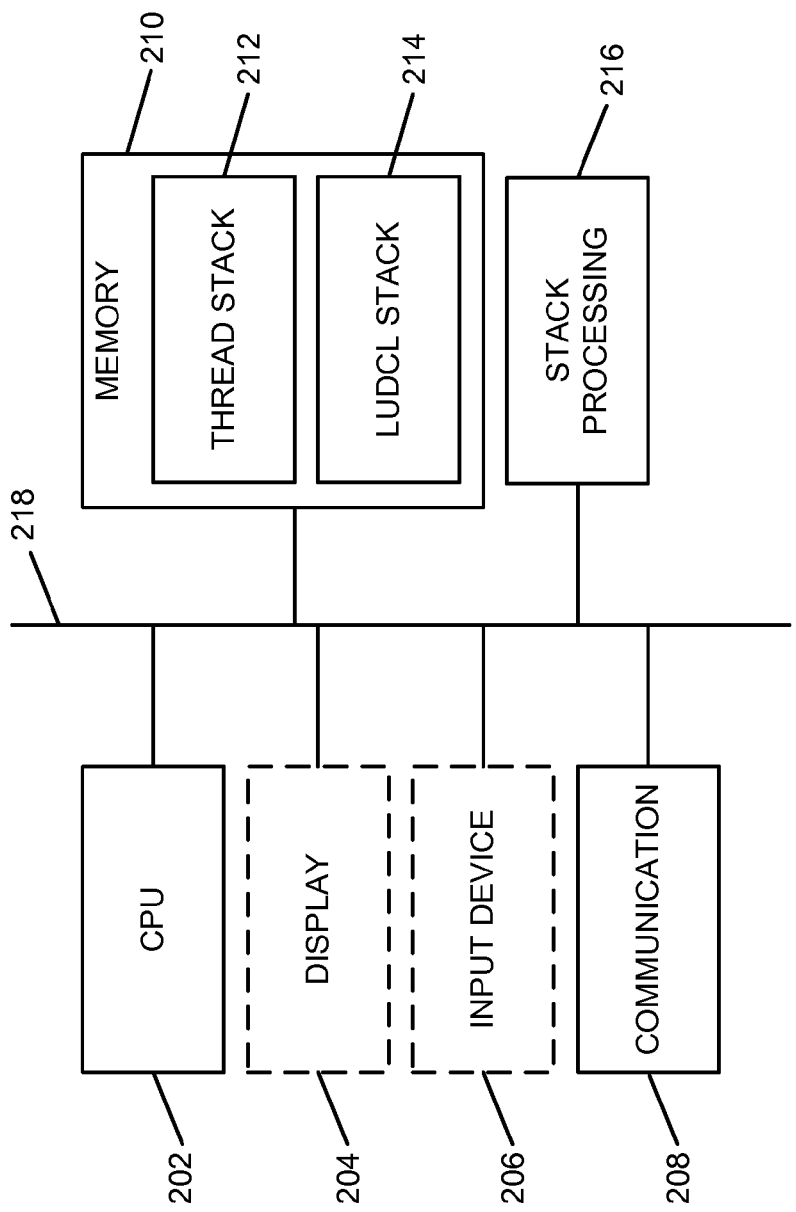
FIG. 2 is a block diagram of an example of an implementation of a core processing module capable of performing automated method frame aggregation for latest user-defined class loader (LUDCL) identification according to an embodiment of the present subject matter.

FIG. 2 is a block diagram of an example of an implementation of a core processing module 200 capable of performing automated method frame aggregation for latest user-defined class loader (LUDCL) identification. The core processing module 200 may form a portion of each of the client_1 102 through the client_N 104 and the database server 108, as appropriate for a given implementation. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without user configurability or feedback. However, the core processing module 200 may also provide user feedback and configurability via the display 204 and the input device 206, respectively.

A communication module 208 provides interconnection capabilities that allow the core processing module 200 to communicate with other modules within a system, such as the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a thread stack storage area 212 that stores thread stacks for storage of method frames for one or more threads operating in association with the core processing module 200. The memory 210 also includes an LUDCL stack storage area 214 that stores references to user-defined class loaders as the user-defined class loaders are identified, for example, during de-serialization operations.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A stack processing module 216 is also illustrated. The stack processing module 216 provides stack management capabilities for the core processing module 200, as described above and in more detail below. The stack processing module 216 implements the automated method frame aggregation for latest user-defined class loader (LUDCL) identification of the core processing module 200.

Though the stack processing module 216 is illustrated as a component-level module for ease of illustration and description purposes, it should be noted that the stack processing module 216 may include any hardware, programmed processor(s), and memory used to carry out the functions of this module as described above and in more detail below. For example, the stack processing module 216 may include additional controller circuitry in the form of application specific integrated circuits (ASICs), processors, and/or discrete integrated circuits and components for performing communication and electrical control activities associated with the respective devices. Additionally, the stack processing module 216 may include interrupt-level, stack-level, and application-level modules as appropriate. Furthermore, the stack processing module 216 may include any memory components used for storage, execution, and data processing for performing processing activities associated with the module.

It should also be noted that the stack processing module 216 may form a portion of other circuitry described without departure from the scope of the present subject matter. Further, the stack processing module 216 may alternatively be implemented as an application stored within the memory 210. In such an implementation, the stack processing module 216 may include instructions executed by the CPU 202 for performing the functionality described herein. The CPU 202 may execute these instructions to provide the processing capabilities described above and in more detail below for the core processing module 200. The stack processing module 216 may form a portion of an interrupt service routine (ISR), a portion of an operating system, a portion of a browser application, or a portion of a separate application without departure from the scope of the present subject matter. Additionally, the stack processing module 216 may form a portion of a JDK or application level process without departure from the scope of the present subject matter.

The CPU 202, the display 204, the input device 206, the communication module 208, the memory 210, and the stack processing module 216 are interconnected via an interconnection 218. The interconnection 218 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

The following several pseudo thread method frame stacks are presented to provide an example of aggregation of method frames of classes loaded by the bootstrap loader within a thread stack. It is understood that the following pseudo thread method frame stacks may be stored in a memory location, such as the thread stack storage area 212 of the memory 210. The ellipsis dots in the following pseudo thread method frame stacks show that additional method frames may be stored within the respective pseudo thread method frame stack.

The following first example pseudo thread method frame stack provides an example of aggregation of bootstrap loader methods on a thread method frame stack.

```
at EndAggregation1( )
at Aggregation1MethodN( )
...
at Aggregation1Method1( )
at StartAggregation1( )
at MainMethod1( )
```

Within the first example pseudo thread method frame stack above, it is assumed that the method frame "MainMethod1( )" belongs to a class loaded by a non-null user-defined class loader. As such, the class that loaded the "MainMethod1( )" may be considered an LUDCL, and may be identified as described in more detail below.

As described above and in more detail below, the present subject matter may track/determine class loader changes from user-defined class loaders to a bootstrap class loader. As such, the method frame "StartAggregation1( )" represents a detected transition from thread stack methods belonging to classes loaded by user-defined class loader(s) to methods belonging to classes loaded by the bootstrap class loader. The method "StartAggregation1( )" is the first method in the execution control flow of the current thread that belongs to a class that is loaded by the bootstrap/null class loader. The method frame "StartAggregation1( )" also represents a point at which to begin walking the stack to identify the LUDCL and cache the LUDCL (e.g., a reference to the class loader object that loaded the class that contains the method Main-Method1( )) within the LUDCL stack, as described above. The stack walk ends at the frame "MainMethod1( )" and the class loader that loaded the "MainMethod1( )" method's class is pushed onto the LUDCL stack.

The method frame "EndAggregation1( )" represents the last frame loaded by the bootstrap loader. As such, the "EndAggregation1( )" method frame is marked within the first example pseudo thread method frame stack, such as by using the LUDCLMarkFrame( ) API described above, to identify an aggregated set of bootstrap loader method frames within the first example pseudo thread method frame stack. As such, a stack walk that may be initiated from a subsequent frame later during the de-serialization process in order to find the latest user-defined class loader will be terminated at this point in response to detection of the marked frame. Termination of the stack walking implies that there is no change to the previously cached LUDCL. As such, it is understood that the LUDCL continues to be the class loader that loaded the class containing the "MainMethod1( )" method.

The present subject matter may also identify a transition from methods belonging to classes loaded by a bootstrap class loader to a user-defined class loader during the de-serialization process, and then subsequently identify a re-transition back from methods belonging to classes loaded by user-defined class loaders to methods belonging to classes loaded by the bootstrap class loader. The second example pseudo thread method frame stack below builds upon the first example pseudo thread method frame stack described above.

```
at EndAggregation2( )
at Aggregation2MethodN( )
...
at Aggregation2Method1( )
at StartAggregation2( )
at Outside Aggregation1Method1( )
...
at EndAggregation1( )
at Aggregation1MethodN( )
...
at Aggregation1Method1( )
at StartAggregation1( )
at MainMethod1( )
```

As can be seen from the second example pseudo thread method frame stack above, the bottom five (5) method frames are identical to the frames described in association with the first example pseudo thread method frame stack above. There are several additional frames shown on the second example pseudo thread method frame stack.

It should be noted that it is assumed for purposes of the present example that the method frame "OutsideAggregation1Method1( )" belongs to a class loaded by a non-null (user-defined) class loader different from the user-defined class loader that loaded the class that the Main-Method1( ) method belongs to. It is further assumed that the methods corresponding to the method frame "StartAggregation2( )" until "EndAggregation2( )" belong to classes loaded by the bootstrap class loader.

As with the first example pseudo thread method frame stack above, upon transitioning back to method frames corresponding to methods of classes loaded by the bootstrap class loader, a stack walk is initiated at the "StartAggregation2( )" method. This second stack walk identifies a new LUDCL at the stack frame corresponding to the "OutsideAggregation1Method1( )" method. The class loader that loaded the class containing the method "OutsideAggregation1Method1( )" is returned as the LUDCL by the stack walk and the new LUDCL is pushed on top of the LUDCL stack.

It should be noted that if the class containing the method "OutsideAggregation1Method1( )" is loaded by the bootstrap class loader, whether it is a user-defined method or other method, then the stack walk initiated at "StartAggregation2( )" would not terminate at the "OutsideAggregation1Method1( )" method. In either situation, the stack walk would continue further until a user-defined class loader or a "marked" method frame is identified/detected. Within the present example, the stack walk would terminate at the "EndAggregation1( )" method frame. Additionally, since there is no change to the LUDCL, the LUDCL stack top would not change and it would continue to point to the reference of the class loader of the class containing the "MainMethod1( )" method.

The method frame "EndAggregation2( )" represents the last frame loaded by the bootstrap loader for the current aggregation. As such, the "EndAggregation2( )" method frame is also marked within the second example pseudo thread method frame stack, such as by using the LUDCLMarkFrame( ) API, as described above in association with the "EndAggregation1( )" method frame.

The process of de-serialization may then proceed further for reconstruction/recreation of an object instance from the serialized data object. Creation of instances of classes involve loading of the respective class/type. In order to perform the class loading operation, the latest user-defined class loader is used. The third example pseudo thread method frame stack below illustrates processing for identification of the LUDCL.

```
at GetLatestUserDefinedLoader( )
...
at EndAggregation2( )
at Aggregation2MethodN( )
...
at Aggregation2Method1( )
at StartAggregation2( )
at OutsideAggregation1Method1( )
...
at EndAggregation1( )
at Aggregation1MethodN( )
...
at Aggregation1Method1( )
at StartAggregation1( )
at MainMethod1( )
```

As can be seen from the third example pseudo thread method frame stack, the "GetLatestUserDefinedLoader( )" method frame has been invoked and is at the top of the third example pseudo thread method frame stack. Otherwise, the third example pseudo thread method frame stack is identical to the second example pseudo thread method frame stack described above. In response to invocation of the "GetLatestUserDefinedLoader( )" method, the LUDCL stack is first looked up (e.g., identified). If the LUDCL stack is not empty, a "peek" operation on the LUDCL stack is performed to get the LUDCL. The "peek" operation, in the present example, will return the loader of the class containing the method "OutsideAggregation1Method1( )" as the LUDCL since this LUDCL is found on the top of the LUDCL stack.

The following example pseudo LUDCL stack depicts a representation of what an LUDCL stack may include in response to processing through the second example pseudo thread method frame stack described above. It is understood that the following example pseudo LUDCL stack may be stored in a memory location, such as the LUDCL stack storage area 214 of the memory 210.

```
Reference to UDCL that loaded OutsideAggregation1Method1( )
Reference to UDCL that loaded MainMethod1( )
```

As can be seen from the example pseudo LUDCL stack above, only two references to user-defined class loaders are stored on the pseudo LUDCL stack. The first reference stored (e.g., the bottom reference) represents a reference to the UDCL that loaded the "MainMethod1( )" method frame. The second reference stored (e.g., the top reference) represents a reference to the UDCL that loaded the "OutsideAggregation1Method1( )" method frame. Again, as described above, the reference to the UDCL that is pushed on the LUDCL stack may be any form of reference to the UDCL as appropriate for a given implementation. For example, the reference to the UDCL may include a pointer/address, a class name, or any other form of reference appropriate for a given implementation.

Figure 3:
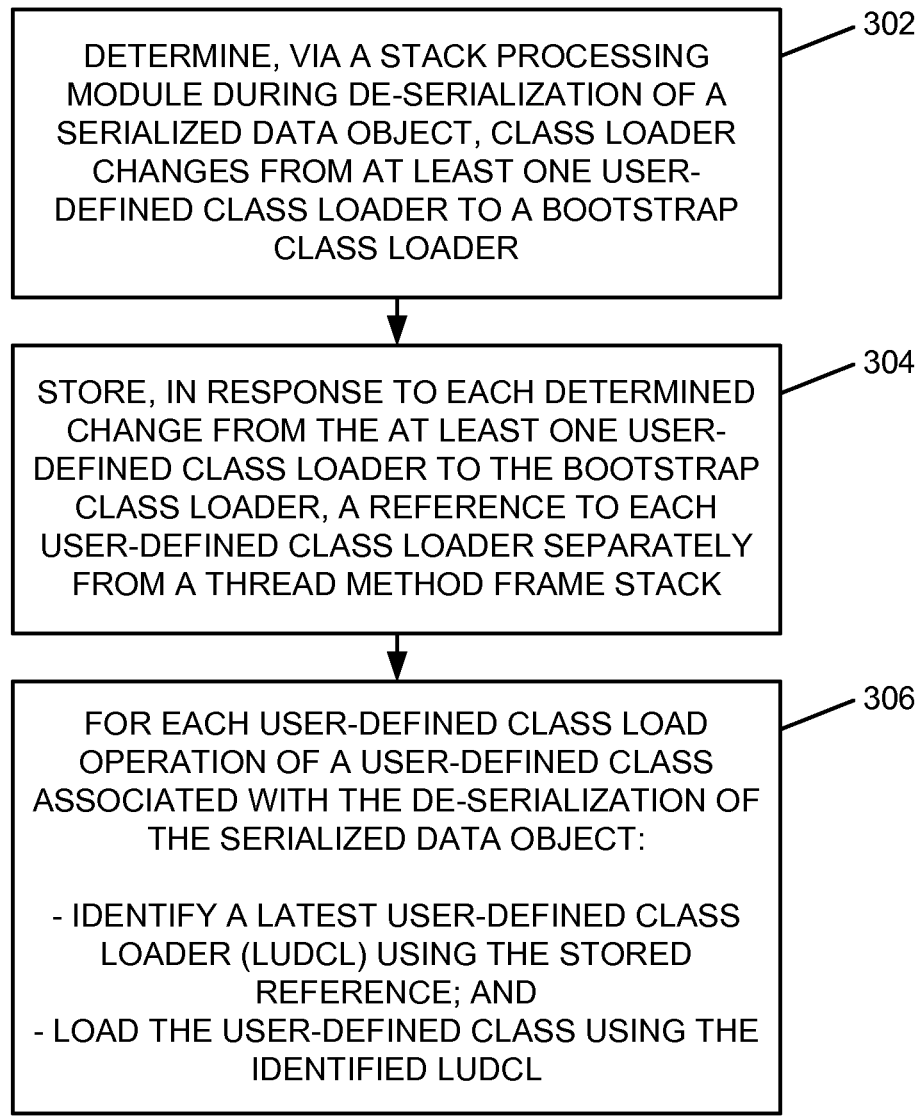
FIG. 3 is a flow chart of an example of an implementation of a process for automated method frame aggregation for latest user-defined class loader (LUDCL) identification during de-serialization of a data object according to an embodiment of the present subject matter.
Figure 4:
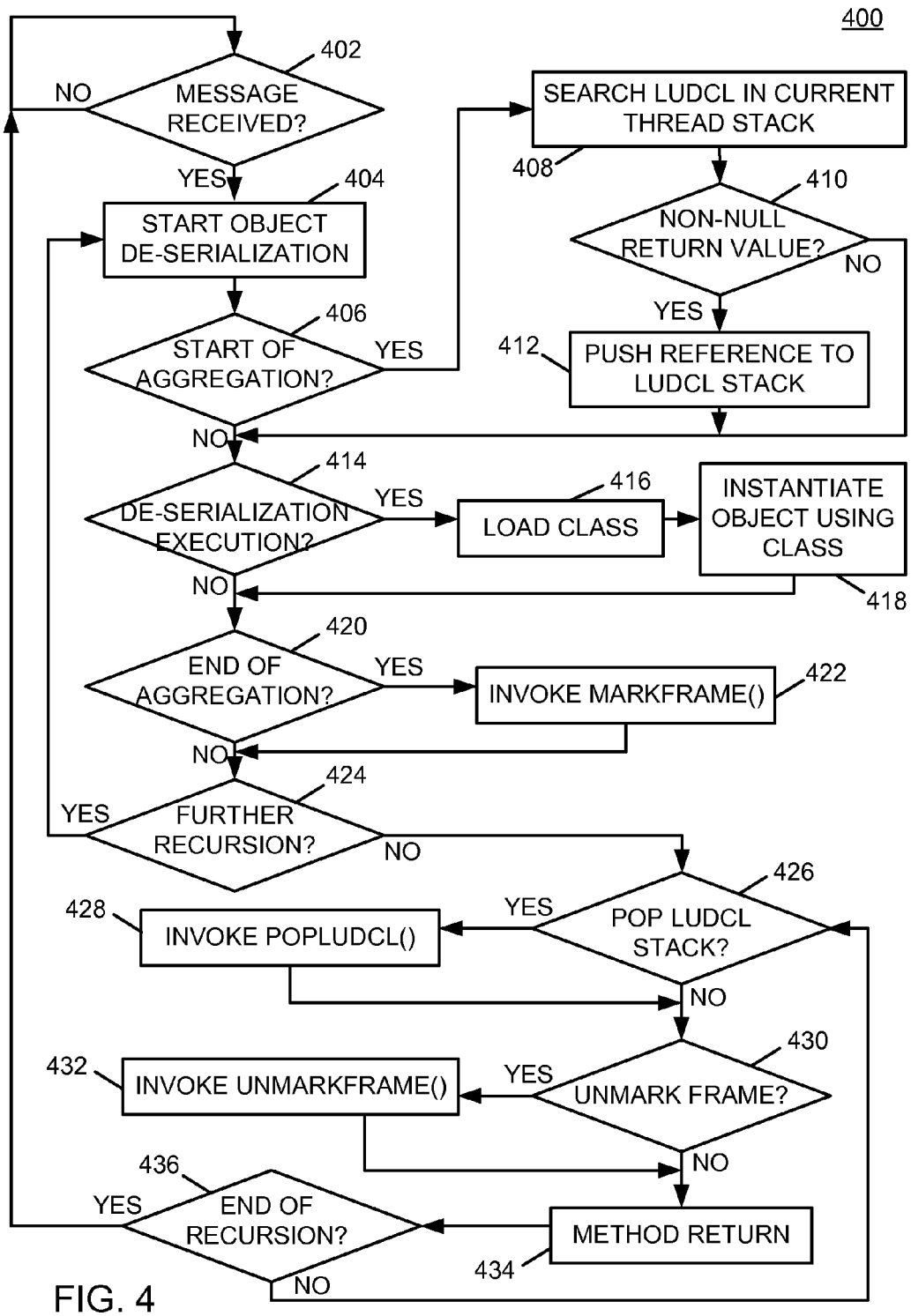
FIG. 4 is a flow chart of an example of an implementation of a process for method frame aggregation for latest user-defined class loader (LUDCL) identification during de-serialization of a data object utilizing an LUDCL stack according to an embodiment of the present subject matter.
Figure 5:
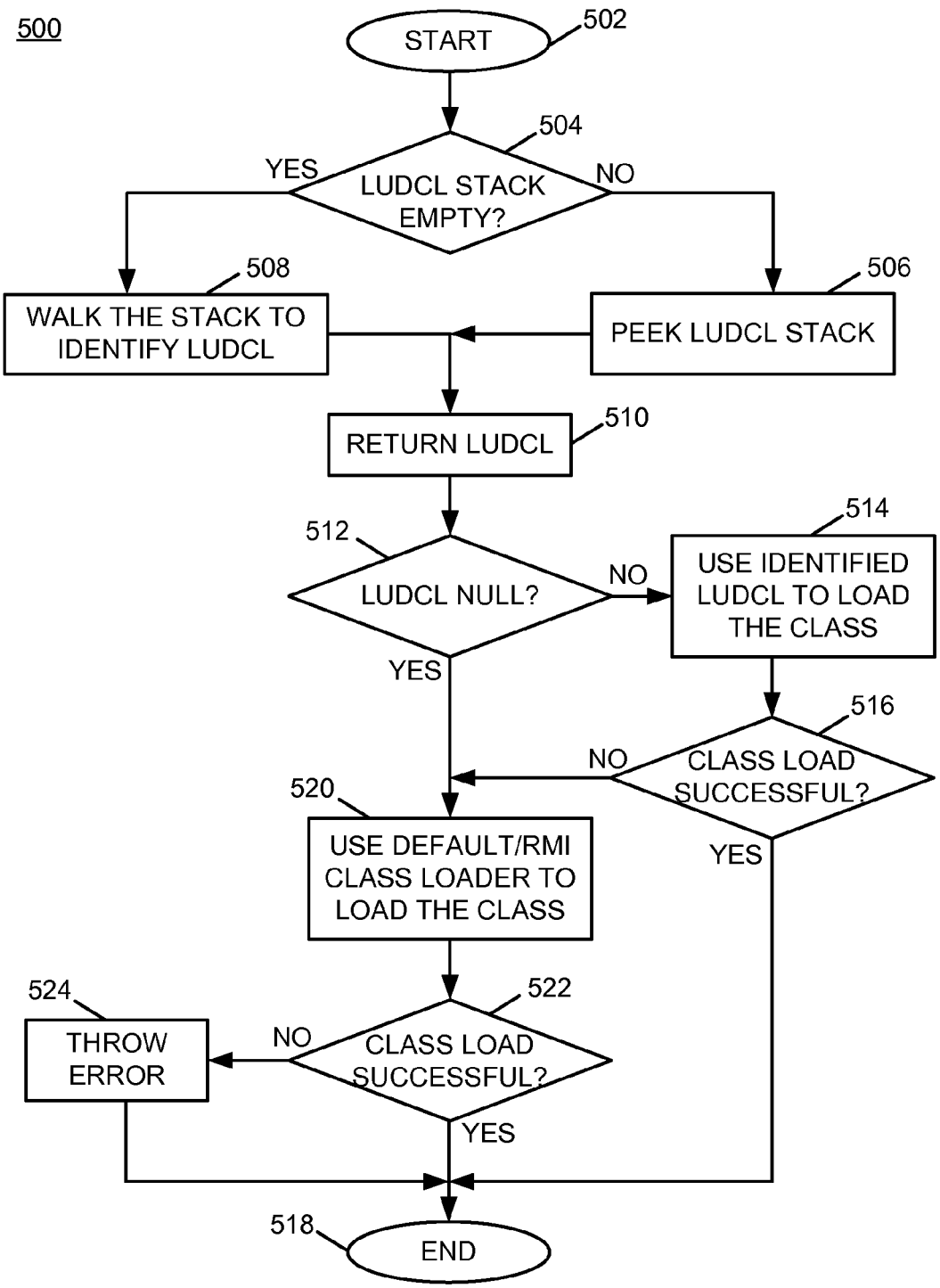
FIG. 5 is a flow chart of an example of an implementation of a process for loading a user-defined class associated with the processing of FIG. 4 according to an embodiment of the present subject matter.

FIG. 3 through FIG. 5 below describe example processes that may be executed by devices, such as the core processing module 200, to perform the automated method frame aggregation for latest user-defined class loader (LUDCL) identification associated with the present subject matter. Many other variations on the example processes are possible and all are considered within the scope of the present subject matter. The example processes may be performed by modules, such as the stack processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated method frame aggregation for latest user-defined class loader (LUDCL) identification during de-serialization of a data object. At block 302, the process 300 determines, via a stack processing module during de-serialization of a serialized data object, class loader changes from at least one user-defined class loader to a bootstrap class loader. At block 304, the process 300 stores, in response to each determined change from the at least one user-defined class loader to the bootstrap class loader, a reference to each user-defined class loader separately from a thread method frame stack. At block 306, for each user-defined class load operation of a user-defined class associated with the de-serialization of the serialized data object, the process 300 identifies a latest user-defined class loader (LUDCL) using the stored reference and loads the user-defined class using the identified LUDCL.

FIG. 4 is a flow chart of an example of an implementation of a process 400 for method frame aggregation for latest user-defined class loader (LUDCL) identification during de-serialization of a data object utilizing an LUDCL stack. At decision point 402, the process 400 makes a determination as to whether a message that includes a serialized data object has been received. As described above, a message that includes a serialized data object may include a message such as a CORBA compliant or other message where the included serialized data object is to be de-serialized in response to receipt of the message, such as for storage within an object database, such as the object database 110. In response to determining that a message that includes a serialized data object has been received, the process 400 begins recursive processing to reconstruct (e.g., de-serialize/un-marshal) the data object. For purposes of the present example, it is assumed that the object may be either a complex data object with nested method invocation such that recursion of the processing occurs through nesting levels of method invocations to de-serialize the object and then the processing recursively exits method frames in response to completion of de-serialization. However, the processing described may also be utilized in a non-recursive manner for non-nested objects.

As such, at block 404, the process 400 starts object de-serialization. At decision point 406, the process 400 makes a determination as to whether a transition has been detected from a user-defined class loader to the bootstrap loader. Such a transition, as described above, represents a start of aggregation within a thread stack. In response to determining that a start of aggregation has been detected, the process 400 searches for the LUDCL in the current thread stack at block 408. As such, the process 400 searches from a top of the aggregated method frame stack for a first one of a marked end of an aggregated sequence of methods belonging to classes loaded by the bootstrap class loader and a method frame belonging to a class loaded by one of the at least one user-defined class loader.

At decision point 410, the process 400 makes a determination as to whether a non-null value has been returned from the thread stack search (e.g., via a peek( ) operation), which indicates that a user-defined class loader has been identified.

In response to determining that a non-null value has been returned from the thread stack search, the process 400 pushes a reference to the LUDCL on the LUDCL stack at block 412. As such, the process 400 stores, in response to first finding the method frame belonging to a class loaded by one of the at least one user-defined class loader, a reference to the at least one user-defined class loader on a separate LUDCL stack as the LUDCL, and as such, identifies, in response to a non-null reference returned from the peek operation, the non-null reference as the LUDCL. Within the present example, the reference represents an address of the user-defined class loader. However, any other form of reference may be used as appropriate for a given implementation.

In response to either pushing the reference on the LUDCL stack at block 412, determining at decision point 410 that a non-null value has not been returned from the thread stack search, or determining at decision point 406 that a start of aggregation has not been detected, the process 400 makes a determination at decision point 414 as to whether the current iteration involves de-serialization execution. In response to determining that the current iteration involves de-serialization execution, the process 400 loads a class for the user-defined object at block 416. Detailed processing associated with block 416 will be described below in association with FIG. 5. At block 418, the process 400 instantiates the respective object using the loaded class.

In response to instantiating the respective object at block 418 or in response to determining at decision point 414 that the current iteration does not involve de-serialization execution, the process 400 makes a determination as to whether an end of aggregation is detected at decision point 420. As described above, detection of an end of aggregation represents detecting a transition from a method belonging to a class loaded by a bootstrap loader to a method belonging to a class loaded by a user-defined class loader. In response to determining that an end of aggregation has been detected, the process 400 invokes the markFrame( ) API at block 422. As such, the process 400 marks a last method frame belonging to class loaded by the bootstrap loader within the aggregated method frame stack, where the marked last method frame belonging to the class loaded by the bootstrap loader identifies an end of an aggregated sequence of methods loaded by the bootstrap class loader. In response to either invoking the markFrame( ) API at block 422 or determining at decision point 420 that an end of aggregation has not been detected, the process 400 makes a determination as to whether further recursion is needed to de-serialize the received serialized data object at decision point 424. In response to determining that further recursion is needed to de-serialize the received serialized data object, the process 400 returns to block 404 and iterates as described above for each such recursion. In response to determining at decision point 424 that no further recursion is needed to de-serialize the received serialized data object (e.g., that de-serialization of the received serialized data object is completed), the process 400 determines that de-serialization of the serialized data object is completed and begins recursively exiting each entered method by automatically invoking processing to exit all invoked methods used for de-serialization of the object beginning with decision point 426.

At decision point 426, the process 400 makes a determination as to whether to pop an LUDCL reference from the LUDCL stack. For example, the process 400 may determine, relative to a pending exit from a method that pushed an LUDCL reference on the LUDCL stack, to pop the pushed LUDCL reference from the stack. In response to determining to pop an LUDCL from the LUDCL stack, the process 400 invokes the popLUDCL( ) API at block 428. In response to completion of the invocation of the popLUDCL( ) API at block 428 or in response to a determination at decision point 426 not to pop an LUDCL from the LUDCL stack, the process 400 makes a determination at decision point 430 as to whether to unmark the current method frame. As such, the process 400 determines whether each method frame represents a marked method frame to be unmarked.

In response to determining to unmark the current method frame at decision point 430, the process 400 invokes the unMarkFrame( ) API at block 432. As such, the process 400 iterates to unmark each method frame determined to include the marked method frame. It should be noted that if a method invokes the markFrame( ) API, the unMarkFrame( ) API is invoked during exit of the method. In response to completion of the unMarkFrame( ) API at block 432 or in response to determining not to unmark the current method frame at decision point 430, the process 400 returns from the method at block 434. At decision point 436, the process 400 makes a determination as to whether an end of recursion has been detected. In response to determining that additional nested method invocations are present and that an end of recursion has not been detected, the process 400 returns to decision point 426 and iterates as described above. In response to determining that an end of recursion has been detected at decision point 436, the process 400 returns to decision point 402 to await a new message for de-serialization.

FIG. 5 is a flow chart of an example of an implementation of a process 500 for loading a user-defined class associated with the processing at block 416 of FIG. 4. It is understood that the process 500 forms a part of the process 400 of FIG. 4 and that the reference designators provided are for ease of description purposes. It is further understood that a detailed description of the various processing described in association with FIG. 5 has been provided above and is not repeated below for brevity. Reference is made to the description above for additional detail.

The process 500 starts at 502 in response to entry into block 416 of FIG. 4. At decision point 504, the process 500 makes a determination as to whether the LUDCL stack is empty. In response to determining that the LUDCL stack is not empty, the process 500 performs a peek operation on the LUDCL stack to retrieve a reference to the LUDCL stored on the LUDCL stack at block 506. In response to determining that the LUDCL stack is empty at decision point 504, the process 500 walks the thread method frame stack to identify the LUDCL at block 508. At block 510, the identified LUDCL from the respective processing at one of block 506 and 508 is returned.

At decision point 512, the process 512 makes a determination as to whether the returned LUDCL is null. In response to determining that the returned LUDCL is not null, the process 500 uses the returned LUDCL to load the class at block 514. At decision point 516, the process 500 makes a determination as to whether the class load operation was successful. In response to determining that the class load operation was successful at decision point 516, the process 500 ends at 518 and returns to the processing associated with block 418 of FIG. 4.

In response to determining that the class load operation was not successful at decision point 516, or in response to determining that the returned LUDCL was null at decision point 512, the process 500 utilizes the default class loader (e.g., the RMI class loader for purposes of the present example) to load the class at block 520. At decision point 522, the process 500 makes a determination as to whether the class load operation utilizing the default class loader was successful. In response to determining that the class load operation utilizing the default class loader was not successful, the process 500 throws an exception (e.g., error indication) at block 524. In response to either throwing the exception at block 524, or in response to determining that the class load operation utilizing the default class loader was successful at decision point 522, the process ends at 518 and returns to the processing associated with block 418 of FIG. 4.

As described above in association with FIG. 1 through FIG. 5, the example systems and processes provide method frame aggregation for latest user-defined class loader (LUDCL) identification. Many other variations and additional activities associated with method frame aggregation for latest user-defined class loader (LUDCL) identification are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    determining, via a processor during de-serialization of a serialized data object, class loader changes from at least one user-defined class loader to a bootstrap class loader;
    storing, in response to each determined change from the at least one user-defined class loader to the bootstrap class loader, a reference to each user-defined class loader separately from a thread method frame stack, where storing, in response to each determined change from the at least one user-defined class loader to the bootstrap class loader, the reference to each user-defined class loader separately from the thread method frame stack comprises:
        searching from a top of the thread method frame stack for a first method frame belonging to a latest user-defined class loaded by one of the at least one user-defined class loader; and
        storing a reference to the one of the at least one user-defined class loader within a latest user-defined class loader (LUDCL) stack; and
    for each user-defined class load operation of a user-defined class associated with the de-serialization of the serialized data object:
        identifying a latest user-defined class loader (LUDCL) using the stored reference; and
        loading the user-defined class using the identified LUDCL.

2. The method of claim 1, where determining, via the processor during the de-serialization of the serialized data object, the class loader changes from the at least one user-defined class loader to the bootstrap class loader comprises determining an invocation of a de-serializer module.

3. The method of claim 1, further comprising aggregating, in response to determining the class loader changes from the at least one user-defined class loader to the bootstrap class loader, method frames on the thread method frame stack that belong to classes loaded by the bootstrap loader within a de-serializer module.

4. The method of claim 3, where aggregating, in response to determining the class loader changes from the at least one user-defined class loader to the bootstrap class loader, the method frames on the thread method frame stack that belong to the classes loaded by the bootstrap loader within the de-serializer module comprises:
    determining an exit from the de-serializer module; and
    marking a last frame within the thread method frame stack that belongs to one of the classes loaded by the bootstrap loader.

5. The method of claim 1, where identifying, for each user-defined class load operation associated with the de-serialization of the serialized data object, the LUDCL comprises:
    determining whether the LUDCL stack comprises at least one stored reference to at least one LUDCL; and
    identifying the at least one stored reference to the at least one LUDCL as the identified LUDCL in response to determining that the LUDCL stack comprises the at least one stored reference to the at least one LUDCL.

6. The method of claim 5, further comprising:
    in response to determining that the LUDCL stack does not comprise the at least one stored reference to the at least one LUDCL:
        searching from the top of the thread method frame stack for a latest method frame belonging to the latest class loaded by the one of the at least one user-defined class loader;
        determining whether the thread method frame stack comprises the method frame belonging to the latest class loaded by the one of the at least one user-defined class loader prior to reaching one of a marked method frame and a bottom of the thread method frame stack; and
        identifying, in response to determining that the thread method frame stack comprises the method frame belonging to the latest class loaded by the one of the at least one user-defined class loader prior to reaching the one of the marked method frame and the bottom of the thread method frame stack, the one of the at least one user-defined class loader as the LUDCL.

7. The method of claim 1, further comprising:
determining, for each method frame on the thread method frame stack that represents a method to be exited during the de-serialization of the serialized data object whether a class loader change from the bootstrap class loader to the one of the at least one user-defined class loader is associated with each method frame; and
popping a value associated with the one of the user-defined class loader in response to each determined class loader change from the bootstrap class loader to the one of the at least one user-defined class loader from the LUDCL stack.

8. A system, comprising:
a memory; and
a processor programmed to:
determine, during de-serialization of a serialized data object, class loader changes from at least one user-defined class loader to a bootstrap class loader;
store, in response to each determined change from the at least one user-defined class loader to the bootstrap class loader, a reference to each user-defined class loader separately from a thread method frame stack within the memory, where the memory further comprises a latest user-defined class loader (LUDCL) stack and where, in being programmed to store, in response to each determined change from the at least one user-defined class loader to the bootstrap class loader, the reference to each user-defined class loader separately from the thread method frame stack within the memory, the processor is programmed to:
search from a top of the thread method frame stack for a first method frame belonging to a latest user-defined class loaded by one of the at least one user-defined class loader; and
store a reference to the one of the at least one user-defined class loader within the LUDCL stack; and
for each user-defined class load operation of a user-defined class associated with the de-serialization of the serialized data object:
identify a latest user-defined class loader (LUDCL) using the stored reference; and
load the user-defined class using the identified LUDCL.

9. The system of claim 8, where, in being programmed to determine, during the de-serialization of the serialized data object, the class loader changes from the at least one user-defined class loader to the bootstrap class loader, the processor is programmed to determine an invocation of a de-serializer module.

10. The system of claim 8, where the processor is further programmed to aggregate, in response to determining the class loader changes from the at least one user-defined class loader to the bootstrap class loader, method frames on the thread method frame stack that belong to classes loaded by the bootstrap loader within a de-serializer module.

11. The system of claim 10, where, in being programmed to aggregate, in response to determining the class loader changes from the at least one user-defined class loader to the bootstrap class loader, the method frames on the thread method frame stack that belong to the classes loaded by the bootstrap loader within the de-serializer module, the processor is programmed to:
determine an exit from the de-serializer module; and
mark a last frame within the thread method frame stack that belongs to one of the classes loaded by the bootstrap loader.

12. The system of claim 8, where, in being programmed to identify, for each user-defined class load operation associated with the de-serialization of the serialized data object, the LUDCL, the processor is programmed to:
determine whether the LUDCL stack comprises at least one stored reference to at least one LUDCL; and
identify the at least one stored reference to the at least one LUDCL as the identified LUDCL in response to determining that the LUDCL stack comprises the at least one stored reference to the at least one LUDCL.

13. The system of claim 12, where the processor is further programmed to:
in response to determining that the LUDCL stack does not comprise the at least one stored reference to the at least one LUDCL:
search from the top of the thread method frame stack for a latest method frame belonging to the latest class loaded by the one of the at least one user-defined class loader;
determine whether the thread method frame stack comprises the method frame belonging to the latest class loaded by the one of the at least one user-defined class loader prior to reaching one of a marked method frame and a bottom of the thread method frame stack; and
identify, in response to determining that the thread method frame stack comprises the method frame belonging to the latest class loaded by the one of the at least one user-defined class loader prior to reaching the one of the marked method frame and the bottom of the thread method frame stack, the one of the at least one user-defined class loader as the LUDCL.

14. The system of claim 8, where the processor is further programmed to:
determine, for each method frame on the thread method frame stack that represents a method to be exited during the de-serialization of the serialized data object whether a class loader change from the bootstrap class loader to the one of the at least one user-defined class loader is associated with each method frame; and
pop a value associated with the one of the user-defined class loader in response to each determined class loader change from the bootstrap class loader to the one of the at least one user-defined class loader from the LUDCL stack.

15. A computer program product comprising a computer readable storage memory including computer readable program code, where the computer readable program code when executed on a computer causes the computer to:
determine, during de-serialization of a serialized data object, class loader changes from at least one user-defined class loader to a bootstrap class loader;
store, in response to each determined change from the at least one user-defined class loader to the bootstrap class loader, a reference to each user-defined class loader separately from a thread method frame stack, where in causing the computer to store, in response to each determined change from the at least one user-defined class loader to the bootstrap class loader, the reference to each user-defined class loader separately from the thread method frame stack, the computer readable program code when executed on the computer causes the computer to:

search from a top of the thread method frame stack for a first method frame belonging to a latest user-defined class loaded by one of the at least one user-defined class loader; and store a reference to the one of the at least one user-defined class loader within a latest user-defined class loader (LUDCL) stack; and for each user-defined class load operation of a user-defined class associated with the de-serialization of the serialized data object:

identify a latest user-defined class loader (LUDCL) using the stored reference; and load the user-defined class using the identified LUDCL.

16. The computer program product of claim 15, where in causing the computer to determine, during the de-serialization of the serialized data object, the class loader changes from the at least one user-defined class loader to the bootstrap class loader, the computer readable program code when executed on the computer causes the computer to determine an invocation of a de-serializer module.

17. The computer program product of claim 15, where the computer readable program code when executed on the computer further causes the computer to aggregate, in response to determining the class loader changes from the at least one user-defined class loader to the bootstrap class loader, method frames on the thread method frame stack that belong to classes loaded by the bootstrap loader within a de-serializer module.

18. The computer program product of claim 17, where in causing the computer to aggregate, in response to determining the class loader changes from the at least one user-defined class loader to the bootstrap class loader, the method frames on the thread method frame stack that belong to the classes loaded by the bootstrap loader within the de-serializer module, the computer readable program code when executed on the computer causes the computer to:

determine an exit from the de-serializer module; and mark a last frame within the thread method frame stack that belongs to one of the classes loaded by the bootstrap loader.

19. The computer program product of claim 15, where in causing the computer to identify, for each user-defined class load operation associated with the de-serialization of the serialized data object, the LUDCL, the computer readable program code when executed on the computer causes the computer to:

determine whether the LUDCL stack comprises at least one stored reference to at least one LUDCL; and identify the at least one stored reference to the at least one LUDCL as the identified LUDCL in response to determining that the LUDCL stack comprises the at least one stored reference to the at least one LUDCL.

20. The computer program product of claim 19, where the computer readable program code when executed on the computer further causes the computer to:

in response to determining that the LUDCL stack does not comprise the at least one stored reference to the at least one LUDCL:

search from the top of the thread method frame stack for a latest method frame belonging to the latest class loaded by the one of the at least one user-defined class loader;

determine whether the thread method frame stack comprises the method frame belonging to the latest class loaded by the one of the at least one user-defined class loader prior to reaching one of a marked method frame and a bottom of the thread method frame stack; and identify, in response to determining that the thread method frame stack comprises the method frame belonging to the latest class loaded by the one of the at least one user-defined class loader prior to reaching the one of the marked method frame and the bottom of the thread method frame stack, the one of the at least one user-defined class loader as the LUDCL.

21. The computer program product of claim 15, where the computer readable program code when executed on the computer further causes the computer to:

determine, for each method frame on the thread method frame stack that represents a method to be exited during the de-serialization of the serialized data object whether a class loader change from the bootstrap class loader to the one of the at least one user-defined class loader is associated with each method frame; and pop a value associated with the one of the user-defined class loader in response to each determined class loader change from the bootstrap class loader to the one of the at least one user-defined class loader from the LUDCL stack.

* * * * *